US010721778B2

(12) United States Patent
Aguirre et al.

(10) Patent No.: US 10,721,778 B2
(45) Date of Patent: *Jul. 21, 2020

(54) SELECTING RADIO FREQUENCY CHANNELS FOR CARRIER AGGREGATION IN AN UNLICENSED RADIO FREQUENCY SPECTRUM BAND

(71) Applicant: Verizon Patent and Licensing Inc., Arlington, VA (US)

(72) Inventors: Sergio Aguirre, Southlake, TX (US); Rakesh Chandwani, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,767

(22) Filed: Aug. 31, 2018

(65) Prior Publication Data

US 2018/0376515 A1  Dec. 27, 2018

Related U.S. Application Data

(63) Continuation of application No. 14/978,097, filed on Dec. 22, 2015, now Pat. No. 10,085,289.

(51) Int. Cl.
| H04W 4/00 | (2018.01) |
| H04W 74/08 | (2009.01) |
| H04W 16/14 | (2009.01) |
| H04W 72/04 | (2009.01) |
| H04W 74/00 | (2009.01) |

(52) U.S. Cl.
CPC ....... *H04W 74/0866* (2013.01); *H04W 16/14* (2013.01); *H04W 72/0486* (2013.01); *H04W 74/002* (2013.01)

(58) Field of Classification Search
USPC .................................................. 370/329, 336
See application file for complete search history.

(56) References Cited

U.S. PATENT DOCUMENTS

| 10,085,289 | B2* | 9/2018 | Aguirre | H04W 72/0486 |
| 2003/0148764 | A1* | 8/2003 | Kelley | H04W 8/22 455/434 |
| 2014/0274089 | A1* | 9/2014 | Hassan | H04W 40/20 455/452.1 |
| 2015/0054682 | A1 | 2/2015 | Hryciuk | |
| 2016/0087897 | A1* | 3/2016 | Hardt | H04L 47/122 370/237 |
| 2016/0219487 | A1* | 7/2016 | Khawer | H04W 48/14 |

(Continued)

*Primary Examiner* — Phuongchau Ba Nguyen

(57) ABSTRACT

A base station may obtain channel usage information identifying usage of one or more unlicensed radio frequency (RF) spectrum bands. The base station may select a selected band, of the one or more unlicensed RF spectrum bands, based on the channel usage information. The base station may select one or more RF channels, of multiple RF channels included in the selected band, based on a congestion value of the selected band. The congestion value may be determined based on values of the channel usage information corresponding to the selected band. The selected RF channel may include an impaired RF channel that may not permit full bandwidth utilization due to constraints. The base station may communicate with user equipment via the one or more RF channels of the selected band.

20 Claims, 5 Drawing Sheets

(56) References Cited

U.S. PATENT DOCUMENTS

2017/0041949 A1    2/2017  Ngo
2017/0181197 A1    6/2017  Aguirre et al.
2018/0376515 A1*  12/2018  Aguirre ................. H04W 16/14

* cited by examiner

SELECTING RADIO FREQUENCY CHANNELS FOR CARRIER AGGREGATION IN AN UNLICENSED RADIO FREQUENCY SPECTRUM BAND

RELATED APPLICATION

This application is a continuation of U.S. patent application Ser. No. 14/978,097, filed Dec. 22, 2015, the disclosure of which is incorporated herein by reference.

BACKGROUND

Wireless devices may communicate over an unlicensed radio frequency (RF) spectrum band using one or more radio access technologies, such as a wireless local area network (WLAN) radio access technology, a long term evolution (LTE) radio access technology, or the like. An unlicensed RF spectrum band may refer to an RF spectrum band that is open for shared use by any device that complies with regulatory agency rules for communicating via the RF spectrum band. In contrast with most licensed RF spectrum band usage, users of unlicensed RF spectrum bands do not typically have regulatory protection against radio interference from devices of other users. In other words, devices that use the unlicensed RF spectrum band must typically accept any radio interference caused by other devices that use the unlicensed RF spectrum band.

DETAILED DESCRIPTION OF PREFERRED EMBODIMENTS

Figure 1A:
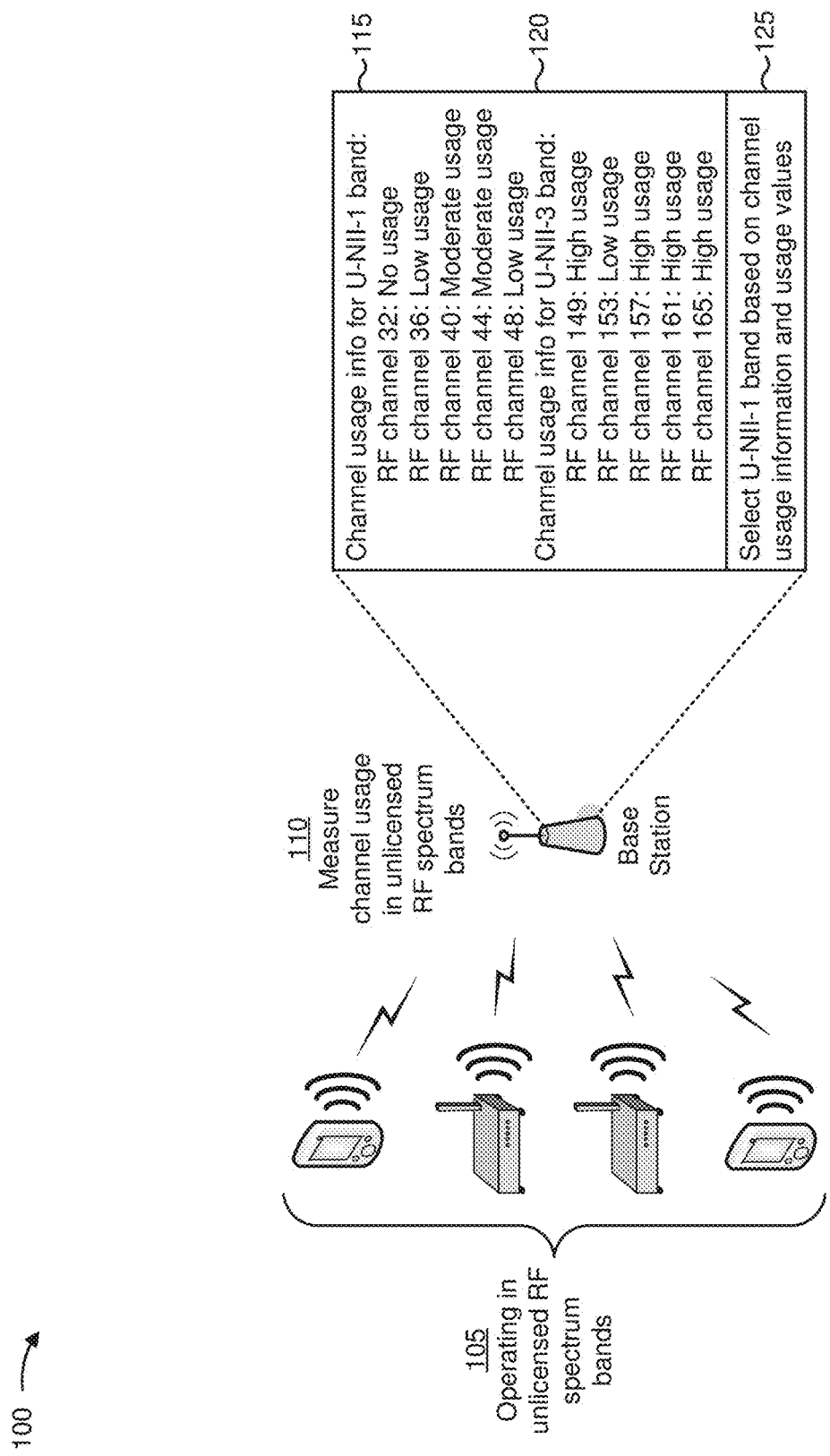
FIGS. 1A and 1B are diagrams of an overview of an example implementation described herein.

The following detailed description of example implementations refers to the accompanying drawings. The same reference numbers in different drawings may identify the same or similar elements.

A wireless device, such as a user equipment (UE), may be capable of communicating using licensed radio frequency (RF) spectrum bands and unlicensed RF spectrum bands. The licensed RF spectrum bands may be licensed for use by a particular network operator, while the unlicensed RF spectrum bands may be open for shared use by any device that complies with regulatory agency rules for communicating via the unlicensed RF spectrum bands. Network operators may wish to utilize unlicensed RF spectrum to reduce network congestion, increase throughput, or the like, by aggregating the unlicensed RF spectrum band with the licensed RF spectrum band (e.g., using a carrier aggregation system, based on a license-assisted access (LAA) technology, based on a Long-Term-Evolution-Advanced (LTE-A) technology, based on an LTE in unlicensed spectrum (LTE-U) protocol, etc.).

An RF spectrum band (e.g., a licensed RF spectrum band, an unlicensed RF spectrum band, etc.) may be composed of one or more RF channels (also referred to as "carriers" or "carrier frequencies"). Some RF channels may be used by wireless devices more than other RF channels (e.g., based on technical considerations, based on limitations imposed by regulatory agency rules, etc.). As one possible example, RF channel 32 of the Unlicensed National Information Infrastructure (U-NII) Low RF spectrum band (e.g., U-NII-1) may be used less than other RF channels of the U-NII-1 band, and therefore may be less congested than the other RF channels (e.g., as measured by bandwidth utilization, a quantity of allocated time slots for time division multiplexing, etc.).

RF channel 32 may be used less than the other RF channels of the U-NII-1 band based on wireless devices that can transmit on RF channel 32 sometimes being incapable of satisfying limitations imposed by regulatory agency rules regarding out-of-channel transmission values. For example, consumer-grade wireless local area network (WLAN) routers, or the like, may use components that are not sufficiently precise to satisfy out-of-channel transmission limitations on RF channel 32. For this reason, RF channel 32 may be less heavily utilized, and therefore less congested, than other RF channels of the U-NII-1 band.

Implementations described herein enable a base station to select one or more RF channels, of one or more unlicensed RF spectrum bands, via which to communicate with wireless devices. The base station may select the one or more RF channels based on congestion in the one or more unlicensed RF spectrum bands to improve throughput, reduce interference, and the like. In some cases, the base station may select "impaired" RF channels that are historically less congested than other RF channels due to the difficulties in utilizing such channels within required constraints (e.g., RF channel 32 of the U-NII-1 band, RF channel 165 of a U-NII-3 band as described in more detail below, etc.), which reduces interference from other wireless devices operating in a corresponding unlicensed RF spectrum band. In this way, the base station reduces network congestion and interference and improves throughput.

Figure 1B:
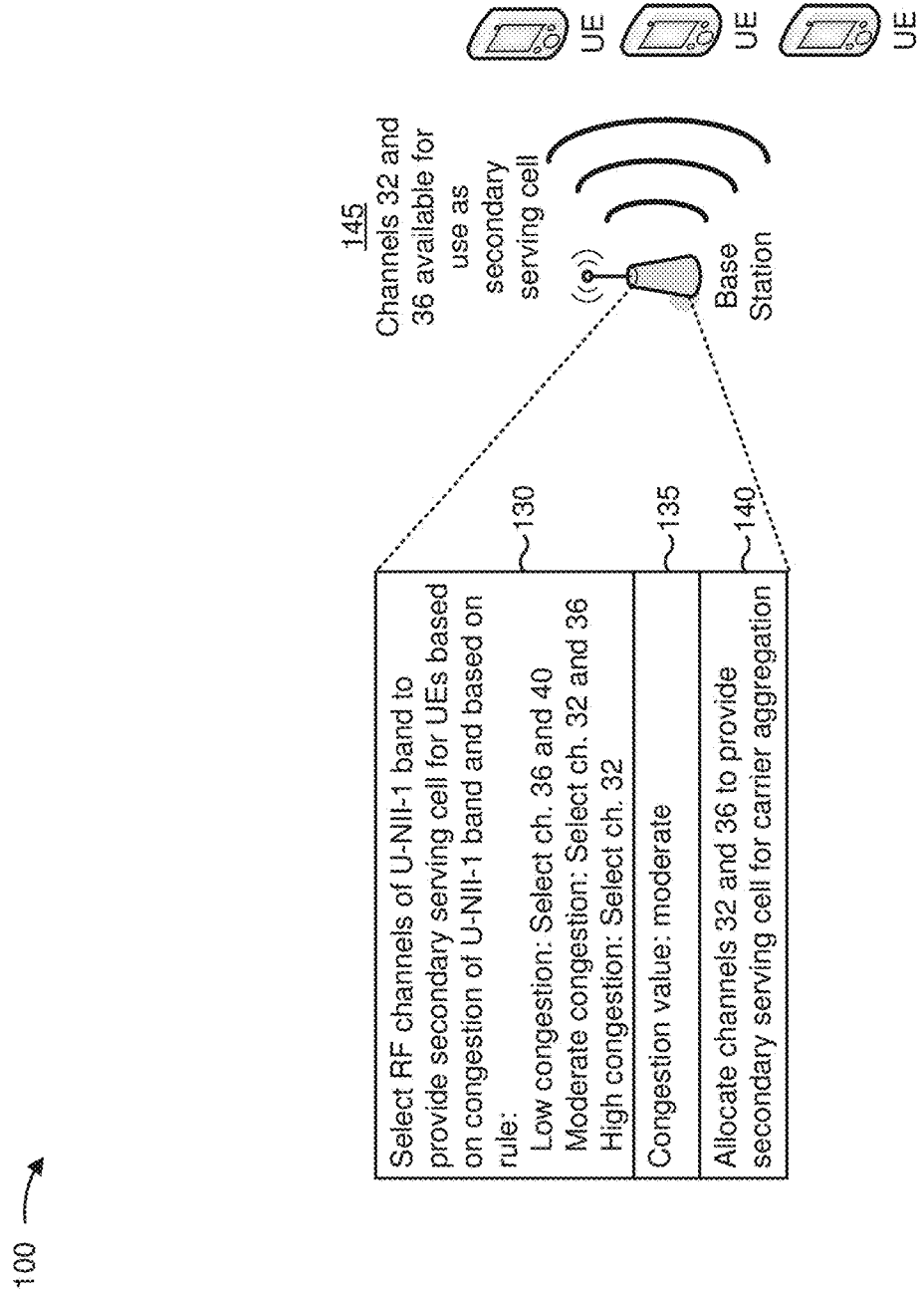

FIGS. 1A and 1B are diagrams of an overview of an example implementation 100 described herein. As shown in FIG. 1A, and by reference number 105, wireless devices (e.g., UEs, access points, WLAN routers, etc.) may operate in one or more unlicensed RF spectrum bands, such as a U-NII radio band. The U-NII radio band may include, for example, a U-NII Low band, or U-NII-1, a U-NII Mid band, or U-NII-2, a U-NII Worldwide band, or U-NII-2e, and/or a U-NII Upper band, or U-NII-3, as described in more detail elsewhere herein.

As the wireless devices operate, the wireless devices may communicate via one or more RF channels of the one or more unlicensed RF spectrum bands, which may create interference and congestion in the one or more RF channels. In some cases, the wireless devices may tend not to operate in a particular impaired RF channel (e.g., RF channel 32 of the U-NII-1 band) based on configurations of the wireless devices and/or based on limitations imposed by regulatory agency rules regarding out-of-channel transmission, as described in more detail above.

As shown by reference number 110, a base station may measure channel usage in the one or more unlicensed RF spectrum bands (e.g., periodically, on demand, etc.). For example, the base station may obtain channel usage information identifying bandwidth utilization values, interference levels, or the like, of RF channels included in the one or more unlicensed RF spectrum bands. A bandwidth utilization value may identify a ratio of allocated bandwidth in a particular RF channel to total bandwidth associated with the particular RF channel, or the like. An interference level may measure a quantity, strength, and/or quality of signals received in the particular RF channel.

As shown by reference number 115, the base station may obtain channel usage information relating to the U-NII-1 band. Here, the channel usage information indicates that RF channel 32 is associated with no usage, that RF channels 36 and 48 are associated with low usage (e.g., based on bandwidth utilization values, interference levels, quantities of UEs, etc. associated with RF channels 36 and/or 48), and that RF channels 40 and 44 are associated with moderate usage.

As shown by reference number 120, the base station may obtain channel usage information relating to the U-NII-3 band. Here, the channel usage information indicates that RF channels 149, 157, 161, and 165 are associated with high usage, and that RF channel 153 is associated with low usage. As shown by reference number 125, based on the channel usage information, the base station may select the U-NII-1 band. For example, the base station may determine scores for the U-NII-1 band and the U-NII-3 band based on the channel usage information, and may select the U-NII-1 band based on comparing the scores (e.g., based on a score for the U-NII-1 band indicating that the U-NII-1 band is less congested than the U-NII-3 band), as described in more detail elsewhere herein.

The base station may select the U-NII-1 band to provide a secondary serving carrier (e.g., based on a license-assisted access technology, an LTE-Advanced technology, etc.) to UEs that are associated with the base station. In this case, the base station may use a licensed RF spectrum band for a primary serving carrier (e.g., for uplink information, as an anchor for UEs, etc.), and may use the U-NII-1 band for a secondary serving carrier (e.g., for downlink information). In other cases, the base station may provide uplink information and downlink information via the U-NII-1 band. That is, the base station may use the U-NII-1 band to provide a primary serving carrier for the UEs.

As shown in FIG. 1B, and by reference number 130, the base station may allocate RF channels of the U-NII-1 band based on a congestion value for the U-NII-1 band (e.g., an average value of channel usage information for RF channels associated with the U-NII-1 band, a weighted average value of the channel usage information, a median value of the channel usage information, one or more effective bandwidths of RF channels associated with the U-NII-1 band, etc.). As shown, the base station may allocate the RF channels based on a rule. Here, the rule indicates that RF channels 36 and 40 are to be selected when the congestion value is low, that RF channels 32 and 36 are to be selected when the congestion value is moderate, and that RF channel 32 is to be selected when the congestion value is high (e.g., when other RF channels of the U-NII-1 band are likely to be more congested than RF channel 32).

As shown by reference number 135, the base station determines that the congestion value for the U-NII-1 band is moderate (e.g., based on channel usage information for the RF channels included in the U-NII-1 band). As shown by reference number 140, the base station allocates (e.g., selects) RF channels 32 and 36 to provide a secondary serving carrier in a carrier aggregation operation. For example, the base station may use RF channels of a licensed RF spectrum band to provide a primary serving carrier, and may use RF channels 32 and 36 to provide a secondary serving carrier based on a carrier aggregation operation.

As shown by reference number 145, the base station provides information, to UEs, indicating that RF channels 32 and 36 are available for use to provide secondary serving carriers. In some cases, the base station may provide information identifying a particular bandwidth and/or frequency associated with RF channels 32 and/or 36, time slots associated with RF channels 32 and/or 36, or the like.

In this way, the base station selects an unlicensed RF spectrum band and allocates RF channels of the selected band based on congestion in the selected band. In some implementations, when a selected band is associated with high congestion (e.g., a congestion value that satisfies a threshold), the base station may allocate an impaired RF channel that is typically associated with a lower congestion value (e.g., based on wireless devices that use the selected band not being configured to transmit in the particular RF channel), which reduces congestion and interference.

As indicated above, FIGS. 1A and 1B are provided merely as an example. Other examples are possible and may differ from what was described with regard to FIGS. 1A and 1B.

Figure 2:
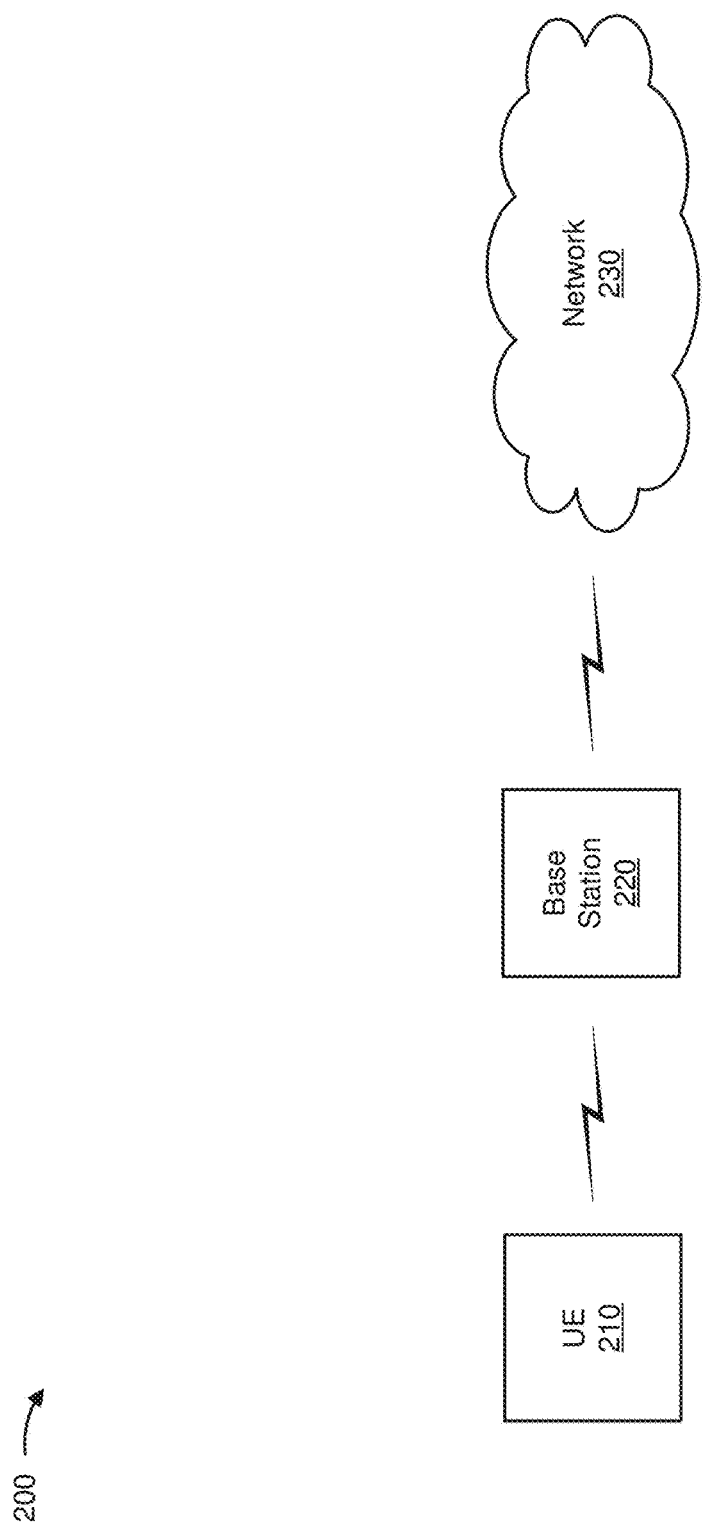
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment (UE) 210, a base station 220, and a network 230. Devices of environment 200 may interconnect via wired connections, wireless connections, or a combination of wired and wireless connections.

UE 210 may include one or more devices capable of connecting to a network via base station 220 and an unlicensed RF spectrum band. For example, UE 210 may include a communication device, such as a mobile phone (e.g., a smart phone, a radiotelephone, etc.), a laptop computer, a tablet computer, a gaming device, a wearable communication device (e.g., a smart wristwatch, a pair of smart eyeglasses, etc.), a machine-to-machine communication device, or a similar type of device.

Base station 220 may include one or more devices capable of transferring traffic, such as audio, video, text, and/or other traffic, destined for and/or received from UE 210. In some implementations, base station 220 may communicate wirelessly with UE 210 using one or more wireless communication protocols, such as, for example, the Institute of Electrical and Electronics Engineers (IEEE) 802.11 protocol (e.g., Wi-Fi), a long term evolution in unlicensed spectrum (LTE-U) protocol, or the like. For example, base station 220 may include a base station of a radio access network, a node B, an evolved node B, a large cell base station (e.g., a base station of a macrocell), a small cell base station (e.g., a base station of a microcell, a picocell, a femtocell, etc.), or the like.

Base station 220 may provide UE 210 with access to an unlicensed RF spectrum band to permit UE 210 to communicate using the unlicensed RF spectrum band. In some implementations, the unlicensed RF spectrum band may be used by base station 220 and UE 210 registered with an operator network (e.g., a cellular network, network 230, etc.) for LTE communications and/or LTE-Advanced (LTE-A) communications, and by WLAN access points and WLAN stations of a WLAN network for WLAN communications. The unlicensed RF spectrum band may be used by the operator network in combination with, or independent from, a licensed RF spectrum band. In some implementations, the unlicensed RF spectrum band may be an RF spectrum band for which UE 210 may need to contend for access because the RF spectrum band is available, at least in part, for unlicensed use, such as WLAN use.

As an example, the unlicensed RF spectrum band may include one or more radio frequencies (e.g., one or more radio frequency spectrum bands) included in the radio spectrum (e.g., the portion of the electromagnetic spectrum corresponding to radio frequencies, or frequencies lower than approximately 300 gigahertz (GHz)). In some implementations, the unlicensed RF spectrum band may include one or more RF spectrum bands that are open for shared use by any device that complies with regulatory agency rules (e.g., associated with a particular country) for communicating via the one or more RF spectrum bands. For example, the unlicensed RF spectrum band may include one or more radio frequencies between approximately 5 GHz and approximately 6 GHz. As a more specific example, the unlicensed RF spectrum band may include one or more radio frequencies between approximately 5.15 GHz and approximately 5.825 GHz.

As another example, the unlicensed RF spectrum band may include one or more RF spectrum bands defined by the United States Federal Communications Commission (FCC) as the Unlicensed National Information Infrastructure (U-NII) radio band. The U-NII radio band may include, for example, a first RF spectrum band between approximately 5.15 GHz and approximately 5.25 GHz (e.g., the U-NII Low band, or U-NII-1), a second RF spectrum band between approximately 5.25 GHz and approximately 5.35 GHz (e.g., the U-NII Mid band, or U-NII-2a), a third RF spectrum band between approximately 5.47 GHz and approximately 5.725 GHz (e.g., the U-NII Worldwide band, or U-NII-2c), and/or a fourth RF spectrum band between approximately 5.725 GHz and approximately 5.825 GHz (e.g., the U-NII Upper band, or U-NII-3).

The unlicensed RF spectrum band may be divided into RF channels via which RF communications may be transmitted. For example, the unlicensed RF spectrum band may include one or more channels of approximately 20 MHz bandwidth. UE 210 may communicate via an RF channel included in the unlicensed RF spectrum band. For example, UE 210 may communicate via an RF channel using a WLAN radio access technology, an LTE radio access technology, or the like.

Network 230 may include one or more wired and/or wireless networks. For example, network 230 may include a radio access network, a cellular network (e.g., an LTE network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, network 230 may include a core network of a cellular network operator.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
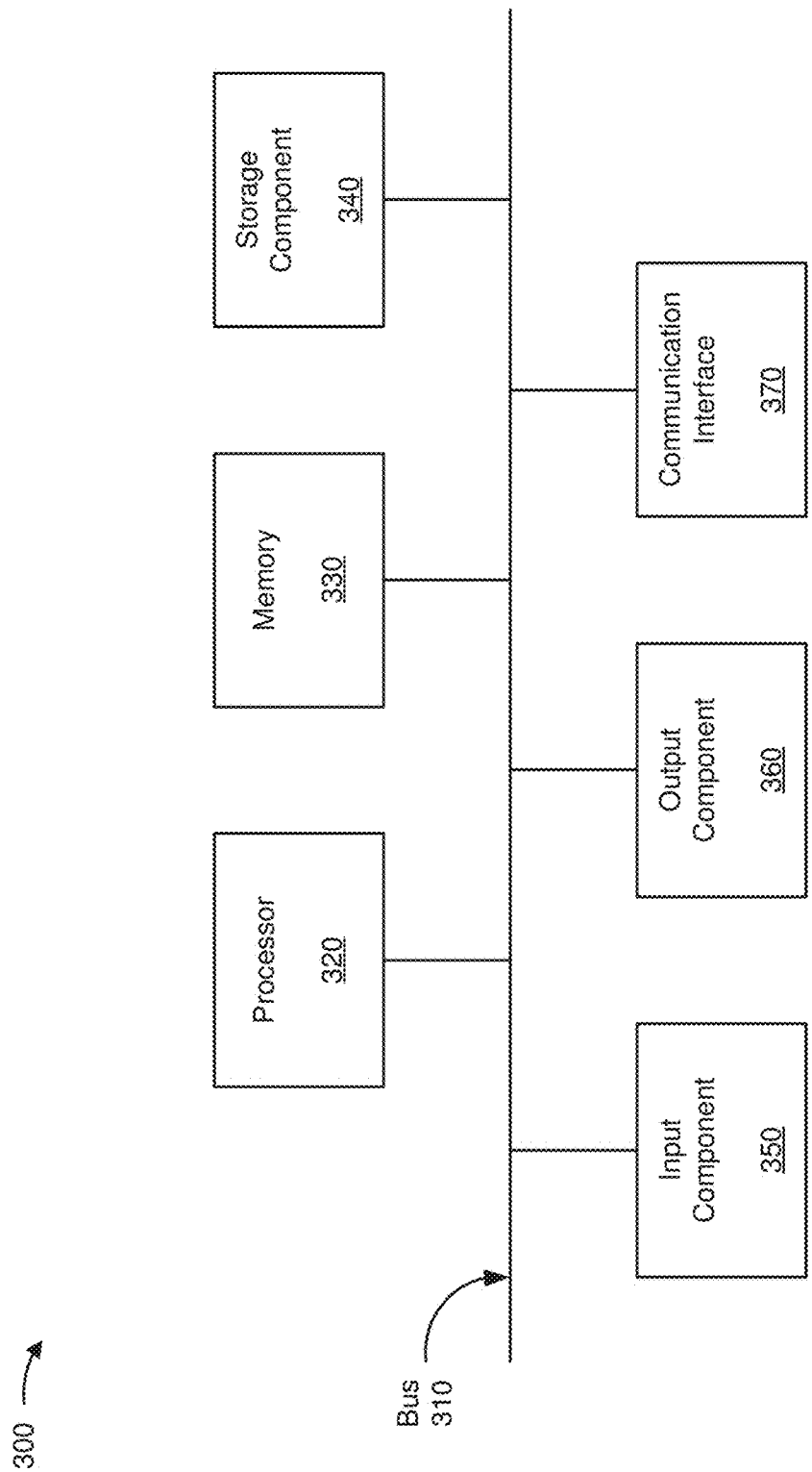
FIG. 3 is a diagram of example components of one or more devices of FIG. 2.

FIG. 3 is a diagram of example components of a device 300. Device 300 may correspond to UE 210 and/or base station 220. In some implementations, UE 210 and/or base station 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a WLAN interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
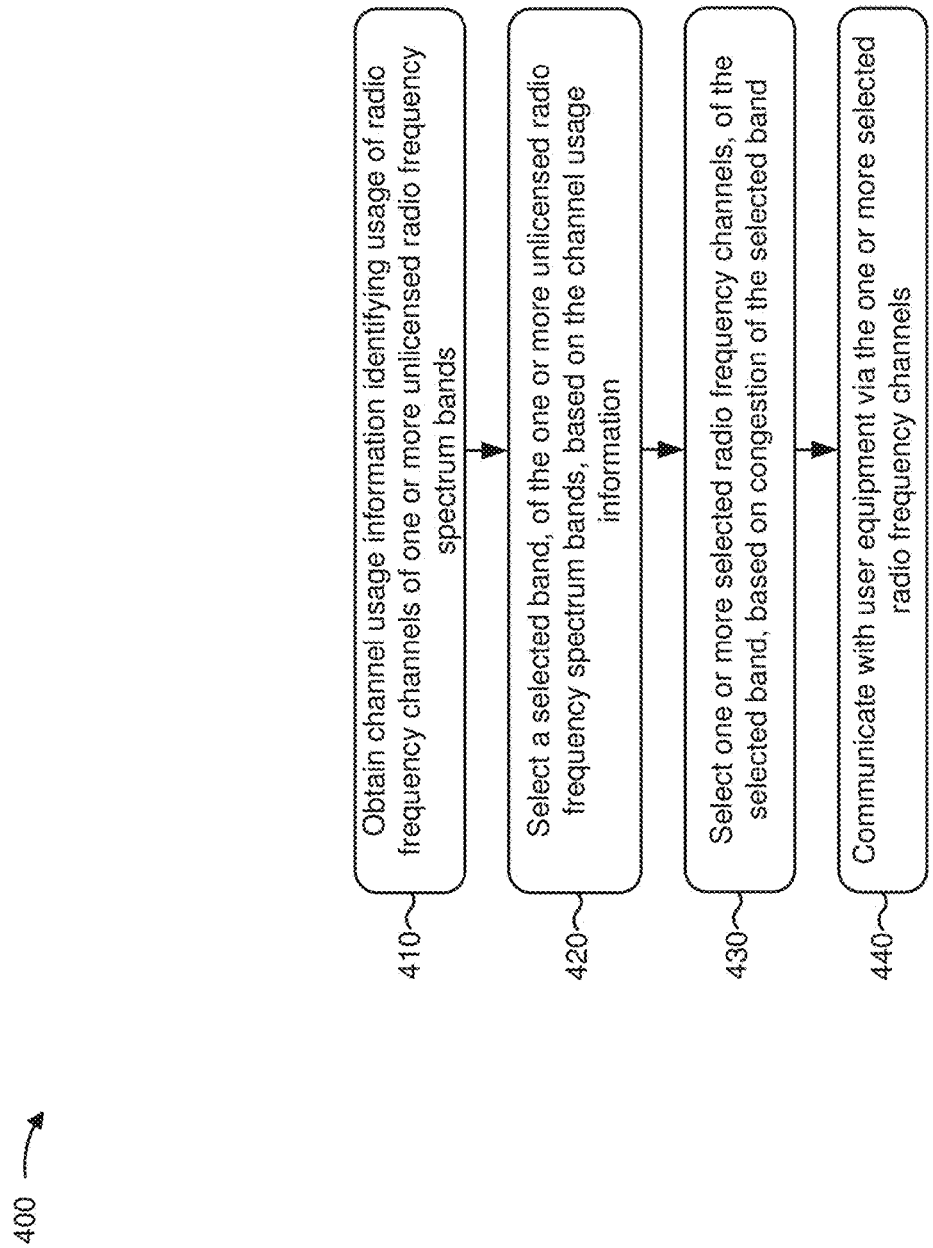
FIG. 4 is a flow chart of an example process for selecting radio frequency channels for carrier aggregation in an unlicensed radio frequency spectrum band.

FIG. 4 is a flow chart of an example process 400 for selecting radio frequency channels for carrier aggregation in an unlicensed radio frequency spectrum band. In some implementations, one or more process blocks of FIG. 4 may be performed by base station 220. In some implementations, one or more process blocks of FIG. 4 may be performed by another device or a group of devices separate from or including base station 220, such as UE 210.

As shown in FIG. 4, process 400 may include obtaining channel usage information identifying usage of radio frequency channels of one or more unlicensed radio frequency spectrum bands (block 410). For example, base station 220 may transmit and/or receive network traffic via one or more RF spectrum bands. In some implementations, base station 220 may transmit and/or receive network traffic via a licensed RF spectrum band and/or a licensed RF channel. For example, a particular UE 210 may be associated with a particular operator network, and the particular UE 210 may communicate with base station 220 on an RF spectrum band and/or an RF channel that is licensed to the particular operator network (e.g., by a government agency). Additionally, or alternatively, base station 220 may communicate with the particular UE 210 on an RF spectrum band and/or an RF channel that is not licensed to the particular operator network (e.g., using an LTE signal, a WLAN signal, etc.).

Base station 220 may obtain channel usage information relating to usage of RF channels of one or more unlicensed RF spectrum bands. The one or more unlicensed RF spectrum bands may include, for example, the U-NII-1 band, the U-NII-2a band, the U-NII-2c band, the U-NII-3 band, when in the United States of America, or another unlicensed RF spectrum band. In some implementations, the channel usage information may include information identifying congestion values of RF channels included in an unlicensed RF spectrum band. For example, the channel usage information for an RF channel may identify a quantity of time slots allocated on the RF channel, may identify a ratio of available time slots on the RF channel to total time slots on the RF channel, may identify a quantity of data transmitted on the RF channel, may identify a signal strength of RF signals received by base station 220 on the RF channel (e.g., RF signals originating from UE 210, originating from a WLAN access point, etc.), may identify a bandwidth utilization value of the RF channel (e.g., based on a ratio of available bandwidth on the RF channel to total bandwidth on the RF channel, etc.), an interference level associated with the RF channel, or the like.

In some implementations, base station 220 may obtain the channel usage information periodically (e.g., once per second, once per minute, once per hour, once per day, etc.), based on an instruction from a user, based on an instruction from another device, based on establishing a session with UE 210, or the like. In some implementations, base station 220 may obtain the channel usage information based on a congestion level of a licensed RF channel and/or a licensed RF spectrum band. For example, base station 220 may determine that a value associated with a licensed RF spectrum band satisfies a threshold (e.g., a threshold congestion level, a threshold bandwidth utilization value, a threshold interference level, a threshold quantity of UEs 210 associated with the licensed RF spectrum band, etc.). Based on determining that the licensed RF spectrum band satisfies the threshold, base station 220 may obtain the channel usage information to allocate unlicensed RF spectrum bandwidth to UEs 210 associated with base station 220 (e.g., in addition to the licensed RF spectrum band, in place of the licensed RF spectrum band, etc.). In this way, base station 220 reduces congestion on the licensed RF spectrum, which improves cellular network operation and increases throughput of the cellular network.

As further shown in FIG. 4, process 400 may include selecting a selected band, of the one or more unlicensed radio frequency spectrum bands, based on the channel usage information (block 420). For example, base station 220 may select a selected band, of the one or more unlicensed RF spectrum bands, based on the channel usage information. In some implementations, base station 220 may select the selected band based on congestion values of the one or more unlicensed RF spectrum bands. For example, base station 220 may select the selected band based on the selected band being less congested than other unlicensed RF spectrum bands of the one or more unlicensed RF spectrum bands.

As one possible example, assume that base station 220 obtains channel usage information for two unlicensed RF spectrum bands: the U-NII-1 band and the U-NII-3 band. Base station 220 may select the selected band, from the U-NII-1 band and the U-NII-3 band, based on the below equations:

Selected band=max($F1,F2$), where $F1=\alpha_{32}U_{32}+\alpha_{36}W_{36}+\alpha_{40}W_{40}+\alpha_{44}W_{44}+\alpha_{48}W_{48}$, and $F2=\alpha_{149}W_{149}+\alpha_{153}W_{153}+\alpha_{157}W_{157}+\alpha_{161}W_{161}+\alpha_{165}W_{165}$.

In the above equations, F1 corresponds to the U-NII-1 band, and F2 corresponds to the U-NII-3 band. F1 and F2 are scores that are assigned to the U-NII-1 band and the U-NII-3 band, respectively, based on values of U, W, and $\alpha$. U, W, and $\alpha$ are described in more detail below. A higher value of F1 or F2 may indicate that a corresponding unlicensed RF spectrum is less congested than a lower value of F1 or F2. For example, when F1 is equal to 0.75, the U-NII-1 band may be less congested than when F1 is equal to 0.25. As shown, base station 220 may select the selected band based on a maximum value of F1 and F2. For example, if F1 is greater than F2, base station 220 may select the U-NII-1 band, and if F2 is greater than F1, base station 220 may select the U-NII-3 band.

W may correspond to weights that may be assigned to RF channels based on a ranking of the RF channels with regard to congestion of the RF channels. For example, a more congested RF channel may be ranked below a less congested RF channel, and may therefore be assigned a lower W value.

Here, $W_{32}$ corresponds to RF channel 32 of the U-NII-1 band, $W_{149}$ corresponds to RF channel 149 of the U-NII-3 band, and so on. In some implementations, W may include values between 0 and 1 (e.g., may be normalized), or may include a different range of values. In some implementations, values of W may be defined by a network operator associated with base station 220. For example, the network operator may define a value of W of 1 for a highest-ranking RF channel, a value of W of 0.5 for a middle-ranking RF channel, a value of W of 0 for a lowest-ranking RF channel, or the like.

U may identify a weight that may be assigned to an impaired RF channel, identified by a subscript of U, that is historically associated with less congestion than other RF channels of a particular band. Here, $U_{32}$ is assigned to RF channel 32 of the U-NII-1 band. In this example, a value of $U_{32}$ may be different (e.g., higher, etc.) than values of W for the U-NII-1 band (e.g., a maximum value of $W_{36}$ through $W_{48}$, an average value of $W_{36}$ through $W_{48}$, etc.). In this way, base station 220 emphasizes RF channel 32 in the selection process based on RF channel 32 being an impaired RF channel that historically being associated with less congestion than other RF channels in the unlicensed RF spectrum, as described in more detail elsewhere herein. In some cases, base station 220 may assign a value of U for an impaired RF channel in another unlicensed RF spectrum band. As one possible example, base station 220 may assign a value of $U_{165}$ for RF channel 165 in the U-NII-3 band (e.g., based on RF channel 165 historically being associated with less usage than other RF channels of the U-NII-3 band).

In some implementations, base station 220 may assign a particular value of U based on an effective bandwidth that base station 220 is capable of transmitting using the impaired RF channel. An effective bandwidth may identify a particular bandwidth that base station 220 is capable of using (e.g., based on components/configuration of base station 220), without violating the constraints that apply to the impaired RF channel (e.g., agency rules regarding out-of-band emissions, power levels, etc.). For example, in some implementations, RF channel 32 may be centered at 5,160 MHz, and may include a range of 20 MHz of bandwidth (e.g., from 5,150 MHz to 5,170 MHz). Some base stations 220 may be incapable of transmitting on the full range of bandwidth of RF channel 32 (e.g., based on regulations limiting out-of-channel transmissions). For example, to ensure that out-of-channel transmissions do not violate a limitation, some base stations 220 may need to transmit on 15 MHz of RF channel 32, 10 MHz of RF channel 32, or the like. Such base stations 220 may assign a value of $U_{32}$ that is lower than a value of $U_{32}$ that may be assigned by base station 220 that can transmit on the full range of RF channel 32. In this way, base station 220 assigns a lower weight to RF channel 32 in a situation where base station 220 can utilize less than all of a bandwidth of RF channel 32, which improves accuracy of the channel selection process.

$\alpha$ may identify a congestion level and/or a utilization level of a corresponding RF channel that is identified by a subscript of $\alpha$. Here, $\alpha_{32}$ corresponds to RF channel 32 of the U-NII-1 band, $\alpha_{149}$ corresponds to RF channel 149 of the U-NII-3 band, and so on. Base station 220 may determine values of $\alpha$ for RF channels based on channel usage information corresponding to the RF channels. For example, an RF channel that is fully utilized (e.g., based on all frequency resources of the RF channel being allotted to operator networks and/or UEs 210, based on all time resources of the RF channel being allotted to operator networks and/or UEs 210, etc.) may be associated with a lowest possible value of $\alpha$ (e.g., 0, etc.), and an RF channel that is completely un-utilized (e.g., based on no frequency resources of the RF channel being allotted, based on no time resources of the RF channel being allotted, etc.) may be associated with a highest possible value of $\alpha$ (e.g., 1, etc.). In some implementations, $\alpha$ may be associated with a different range of values.

In some implementations, base station 220 may determine a particular score based on historical channel usage information. For example, base station 220 may obtain channel usage information periodically, and may store the channel usage information as historical channel usage information. Base station 220 may determine values of W, U, and/or $\alpha$ based on the historical channel usage information. For example, base station 220 may use an average value of multiple, different channel usage information values for an RF channel, may use a weighted average value (e.g., based on more recent channel usage values being assigned a higher weight than less recent channel usage values, based on most recently obtained channel usage information being assigned a higher weight than less recently obtained channel usage information, etc.) of the multiple, different channel usage information values, may discard outliers of the multiple, different channel usage information values, may compare the historical channel usage information to most recently obtained channel usage information to determine whether the channel usage information for an RF channel has changed, or the like.

In some implementations, base station 220 may not collect channel usage information for a particular RF channel. For example, for impaired RF channels (e.g., RF channel 32 of the U-NII-1 band, RF channel 165 of the U-NII-3 band, etc.), base station 220 may not collect channel usage information for the RF channel, which conserves processor resources of base station 220. In some implementations, base station 220 may collect channel usage information for impaired RF channels less frequently than for the other RF channels. For example, base station 220 may collect channel usage information for the other RF channels periodically, and may collect channel usage information for impaired RF channels based on determining that a licensed RF spectrum band is associated with a particular congestion level. In this way, base station 220 conserves processor resources.

In some implementations, base station 220 may determine scores based on a model. For example, the model may receive channel usage information for an unlicensed RF spectrum band as input, and may output a score based on the channel usage information. In some implementations, base station 220 may train the model based on an algorithm (e.g., a machine learning algorithm, etc.). For example, base station 220 may input, to the algorithm, a training set that includes known channel usage information and known scores corresponding to the known channel usage information. Based on the algorithm, base station 220 may train the model to determine a relationship between the known channel usage information and the known scores. After training the model, base station 220 may input, to the model, channel usage information for a particular unlicensed RF spectrum band, and the model may output a score for the particular unlicensed RF spectrum band. In this way, base station 220 conserves processor resources and organizational resources that may otherwise be used to provide the model (e.g., manually), and improves accuracy of the scores.

In some implementations, base station 220 may update the model. For example, base station 220 may input particular channel usage information to the model, and the model may output a score corresponding to the particular channel usage information. Base station 220 may modify the score, and may input the particular channel usage information and the score as modified to the algorithm (e.g., the machine learning algorithm). Based on the algorithm, base station 220 may update the model to cause the model to output the score, as modified, based on the particular channel usage information. Additionally, or alternatively, base station 220 may provide an updated training set that includes new known channel usage information and new known scores, and may update the model based on the algorithm and based on the updated training set. In this way, base station 220 trains and updates the predictive model, which improves accuracy of the scoring process.

In some implementations, base station 220 may determine that a particular RF channel is historically associated with less usage than other RF channels in a particular RF spectrum band. For example, base station 220 may store historical channel usage information for the particular RF spectrum band, and may determine, based on the channel usage information, that the particular RF channel is associated with less usage (e.g., a lower congestion value, a lower bandwidth utilization value, etc.) than the other RF channels. In such a case, base station 220 may assign a particular weight to the particular RF channel (e.g., using a value of U, rather than a value of W, as described in more detail with regard to RF channel 32, above) when determining scores for the particular RF spectrum band. In this way, base station 220 identifies RF channels that are associated with less congestion than other RF channels, which permits base station 220 to allocate resources of the identified RF channels for UEs 210, thereby improving network throughput and reducing congestion of other RF channels.

As further shown in FIG. 4, process 400 may include selecting one or more selected radio frequency channels, of the selected band, based on congestion of the selected band (block 430). For example, base station 220 may select one or more selected RF channels, of RF channels associated with the selected band, based on a congestion level of the selected band. In some implementations, base station 220 may select a single RF channel, and may communicate with UEs 210 via the single RF channel.

In some implementations, base station 220 may select multiple, different RF channels (e.g., consecutive RF channels based on frequencies of the RF channels, non-consecutive RF channels, etc.), and may communicate with UEs 210 via the multiple, different RF channels. In some implementations, base station 220 may select one or more first RF channels for uplink transmissions from UE 210, and may select one or more second RF channels for downlink transmissions to UE 210, which may improve throughput of the uplink transmissions and/or the downlink transmissions.

In some implementations, base station 220 may select an RF channel based on a congestion level of an unlicensed RF spectrum band that includes the RF channel. For example, base station 220 may store a rule that correlates congestion levels of an unlicensed RF spectrum band (e.g., based on channel usage information associated with the unlicensed RF spectrum band) with one or more corresponding RF channels to be selected. In some implementations, base station 220 may determine the congestion level based on a bandwidth utilization value (e.g., based on a ratio of utilized bandwidth for an unlicensed RF spectrum band to total bandwidth for the unlicensed RF spectrum band, based on a ratio of unutilized bandwidth for an unlicensed RF spectrum band to total bandwidth for the unlicensed RF spectrum band, etc.), an interference value, a quantity of UEs 210 associated with the unlicensed RF spectrum band, a WLAN signal strength associated with the unlicensed RF spectrum band, or the like.

In some implementations, base station 220 may allocate resources of the selected band and/or one or more selected RF channels in the time domain. For example, base station 220 may allocate (e.g., queue) downlink traffic for transmission to UEs 210, and/or may transmit downlink traffic to UEs 210, in different time slots or sets of time slots for different RF channels. As an example, base station 220 may cause downlink traffic to be provided via a particular RF channel and in a first time slot, and may cause transmission of the downlink traffic via the particular RF channel to cease in a second time slot (e.g., to permit other devices that use the particular RF channel to use the particular RF channel). In this way, base station 220 reduces interference and increases throughput.

As an example, assume that RF channel 32, of the U-NII-1 band, is associated with historically lower congestion levels than other RF channels of the U-NII-1 band (e.g., RF channels 36 through 48), as described in more detail elsewhere herein. Assume further that base station 220 selects the U-NII-1 band as the selected band. Assume that base station 220 can use 15 MHz of RF channel 32 (e.g., based on regulatory requirements limiting out-of-band transmissions, and based on configuration information of base station 220 identifying RF channel 32 and the bandwidth of 15 MHz), and assume that base station 220 can use 20 MHz of the other RF channels of the U-NII-1 band.

In a situation where the U-NII-1 band is associated with a relatively high congestion value (e.g., a bandwidth utilization value of, for example, approximately 50% to approximately 100%, etc.), base station 220 may determine (e.g., based on a rule, etc.) to use RF channel 32. Base station 220 may communicate with UEs 210 via RF channel 32 (e.g., using 15 MHz of bandwidth, and based on RF channel 32 historically being associated with less congestion than other RF channels of the U-NII-1 band). In this way, base station 220 reduces interference and improves throughput in a high-congestion situation by using an RF channel that is not likely to be associated with significant congestion, even though the channel is impaired (due to the ability to only use 15 MHz of the theoretically available bandwidth of 20 MHz).

Continuing the above example, in a situation where the U-NII-1 band is associated with a moderate congestion value (e.g., a bandwidth utilization value of, for example, between approximately 25% and approximately 50%, etc.), base station 220 may select, for example, RF channel 32 and another selected RF channel of RF channels 36 through 48. Base station 220 may communicate with UEs 210 via RF channel 32 and the other RF channel (e.g., using the 15 MHz of bandwidth associated with RF channel 32 in addition to the 20 MHz of bandwidth associated with the other RF channel). In some implementations, base station 220 may allocate a subset of the bandwidth associated with the other RF channel. For example, if the other RF channel is associated with a bandwidth utilization value of 50%, base station 220 may allocate 10 MHz of bandwidth with regard to the other RF channel (e.g., based on 10 MHz, or 50%, of the bandwidth associated with the other RF channel being utilized). In this way, base station 220 can reduce interference by providing RF signals via RF channel 32, and can increase throughput by providing RF signals via the other selected RF channel.

Still continuing the above example, in a situation where the U-NII-1 band is associated with a relatively low congestion value (e.g., a bandwidth utilization value of, for example, approximately 0% to approximately 25%), base station 220 may select, for example, two or more RF channels of RF channels 36 through 48. Base station 220 may communicate with UEs 210 via the two or more RF channels (e.g., using a total bandwidth that is equal to approximately 20 MHz multiplied by a quantity of the two or more RF channels). For example, in a situation where base station 220 selects two RF channels that are each associated with a bandwidth of 20 MHz and a bandwidth utilization value of 10%, base station 220 may provide a bandwidth of 36 MHz (e.g., based on 90% of the 40 MHz associated with the two RF channels being un-utilized). In this way, base station 220 maximizes throughput by avoiding the impaired RF channel 32.

The example described above may be altered in other configurations. For example, the thresholds described above for determining the bandwidth utilization levels at which an impaired RF channel may be selected for transmission may be adjusted, for example, based on the effective bandwidth of the impaired RF channel available at the base station, measured results of prior threshold assignments on overall congestion and bandwidth utilization, etc.

In some implementations, when base station 220 allocates resources in the time domain, base station 220 may identify a set of time slots allocated to a selected RF channel. In this case, base station 220 may provide the downlink traffic to UE 210 via the selected RF channel and during one or more time slots included in the set of time slots allocated to the selected RF channel. For example, base station 220 may identify one or more available time slots included in the set, and may provide downlink traffic to UE 210 during the one or more time slots. In some implementations, base station 220 may perform similar operations with uplink traffic. For example, base station 220 may provide information to UEs 210 identifying one or more time slots available to the selected RF channel via which the UEs 210 are to transmit uplink information, and may receive uplink traffic from the UEs 210 in the one or more time slots. In this way, base station 220 reduces interference and congestion in the selected RF channel.

As further shown in FIG. 4, process 400 may include communicating with user equipment via the one or more selected radio frequency channels (block 440). For example, base station 220 may communicate with UE 210 via the one or more selected RF channels (e.g., in an uplink direction, in a downlink direction, in an uplink direction and a downlink direction, etc.). Base station 220 may provide information, to UE 210, identifying the one or more selected RF channels, frequencies and/or bandwidths associated with the one or more selected RF channels, time slots associated with the one or more selected RF channels, or the like, and may communicate with UE 210 based on the provided information.

In some implementations, base station 220 may communicate with UE 210 via the one or more selected RF channels of the unlicensed RF spectrum band, and via one or more RF channels of a licensed RF spectrum band. For example, base station 220 may use the one or more selected RF channels for a secondary serving carrier, and may use one or more RF channels associated with the licensed RF spectrum band for a primary serving carrier for UE 210 (e.g., based on a license-assisted access (LAA) technology, based on an LTE-Advanced technology, based on an LTE-U technology, etc.). In such cases, base station 220 may communicate with UE 210 using the licensed RF spectrum band as an anchor (e.g., to permit UE 210 to camp on base station 220) for UE 210 to connect with base station 220, and may receive some communications (e.g., uplink communications, downlink communications, a combination of uplink communications and downlink communications, etc.) via the unlicensed RF spectrum band.

In some implementations, base station 220 may communicate with UE 210 via the one or more selected RF channels without communicating with UE 210 via a licensed RF spectrum band. For example, base station 220 may broadcast information identifying the one or more selected RF channels, may establish a session with UE 210 via the one or more selected RF channels, and may communicate with UE 210 via the one or more selected RF channels. In this way, base station 220 reduces congestion and interference with regard to the licensed RF spectrum band, which improves network efficiency.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, a base station selects an unlicensed RF spectrum band and allocates RF channels of the selected band based on congestion in the selected band. In some implementations, when a selected band is associated with high congestion, the base station may allocate an impaired RF channel that is historically associated with lower congestion than other RF channels in an RF spectrum band, which reduces congestion and interference, and which improves network throughput in high-congestion situations.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
   a memory; and
   one or more processors to:
   determine an effective bandwidth of an impaired radio frequency (RF) channel, the impaired RF channel located within a band of unlicensed RF spectrum containing multiple channels,
      the impaired RF channel being an RF channel that is less congested than other RF channels in the band of unlicensed RF spectrum containing multiple channels;
   obtain channel usage information associated with the band of unlicensed RF spectrum;
   select one or more RF channels from the multiple channels based on one or more congestion values of the band of unlicensed RF spectrum and the effective bandwidth of the impaired RF channel,
      where the one or more processors, when selecting the one or more RF channels, are to:
         select the impaired RF channel as one of the one or more selected RF channels when the one or more congestion values are above a threshold, the threshold being based on the effective bandwidth of the impaired RF channel; and
   communicate with user equipment on the one or more selected RF channels.

2. The base station of claim 1, where the one or more processors, when obtaining the channel usage information, are to:
   obtain channel usage information for the impaired RF channel when a licensed RF spectrum band is associated with a particular congestion level.

3. The base station of claim 1, where the one or more processors are further to:
   identify a set of time slots allocated to one of the one or more selected RF channels, and
   where the one or more processors, when communicating with the user equipment, are to:
      communicate with the user equipment based on the set of time slots allocated to the one of the one or more selected RF channels.

4. The base station of claim 1, where the one or more processors, when obtaining the channel usage information, are to:
   obtain channel usage information for the impaired RF channel when a licensed RF spectrum band satisfies a threshold quantity of user equipment.

5. The base station of claim 1, where
   the one or more processors are further to:
      rank each of the one or more RF channels based on congestion information; and
      apply weights corresponding to the ranking of each of the one or more RF channels, and
   the one or more processors, when selecting the one or more RF channels, are to:
      select the one or more RF channels based on applying the weights.

6. The base station of claim 1, where the one or more processors, when determining the effective bandwidth of the impaired RF channel, are to:
   determine the effective bandwidth of the impaired RF channel based on configuration information associated with the base station.

7. A non-transitory computer-readable medium storing instructions, the instructions comprising:
   one or more instructions that, when executed by one or more processors, cause the one or more processors to:
      determine an effective bandwidth of an impaired radio frequency (RF) channel, the impaired RF channel located within a band of unlicensed RF spectrum containing multiple channels,
         the impaired RF channel being an RF channel that is less congested than other RF channels in the band of unlicensed RF spectrum containing multiple channels;
      obtain channel usage information associated with the band of unlicensed RF spectrum;
      select one or more RF channels from the multiple channels based on one or more congestion values of the band of unlicensed RF spectrum and the effective bandwidth of the impaired RF channel,
         where the one or more instructions, that cause the one or more processors to select the one or more RF channels, cause the one or more processors to:
            select the impaired RF channel as one of the one or more selected RF channels when the one or more congestion values are above a threshold, the threshold being based on the effective bandwidth of the impaired RF channel; and
      communicate with user equipment on the one or more selected RF channels.

8. The non-transitory computer-readable medium of claim 7, where the one or more instructions, that cause the one or more processors to obtain the channel usage information, cause the one or more processors to:
   obtain channel usage information for the impaired RF channel when a licensed RF spectrum band is associated with a particular congestion level.

9. The non-transitory computer-readable medium of claim 7, where the one or more instructions that further cause the one or more processors to:
   identify a set of time slots allocated to one of the one or more selected RF channels, and the one or more instructions, that cause the one or more processors to communicate with the user equipment, cause the one or more processors to:
    communicate with the user equipment based on the set of time slots allocated to the one of the one or more selected RF channels.

10. The non-transitory computer-readable medium of claim 7, the one or more instructions, that cause the one or more processors to determine the effective bandwidth of the impaired RF channel, cause the one or more processors to:
    determine the effective bandwidth of the impaired RF channel based on configuration information associated with a base station.

11. The non-transitory computer-readable medium of claim 7, where
    the one or more instructions further cause the one or more processors to:
        rank each of the one or more RF channels based on congestion information; and
        apply weights corresponding to the ranking of each of the one or more RF channels, and
    the one or more instructions, that cause the one or more processors to select the one or more RF channels, cause the one or more processors to:
        select the one or more RF channels based on applying the weights.

12. The non-transitory computer-readable medium of claim 7, the one or more instructions, that cause the one or more processors to obtain the channel usage information, cause the one or more processors to:
    obtain channel usage information for the impaired RF channel when a licensed RF spectrum band satisfies a threshold quantity of user equipment.

13. A method, comprising:
    determining, by a base station, an effective bandwidth of an impaired radio frequency (RF) channel, the impaired RF channel located within a band of unlicensed RF spectrum containing multiple channels,
        the impaired RF channel being an RF channel that is less congested than other RF channels in the band of unlicensed RF spectrum containing multiple channels;
    obtaining, by the base station, channel usage information associated with the band of unlicensed RF spectrum;
    selecting, by the base station, one or more RF channels from the multiple channels based on one or more congestion values of the band of unlicensed RF spectrum and the effective bandwidth of the impaired RF channel,
        where selecting the one or more RF channels comprises:
            selecting the impaired RF channel as one of the one or more selected RF channels when the one or more congestion values are above a threshold,
                the threshold being based on the effective bandwidth of the impaired RF channel; and
    communicating, by the base station, with user equipment on the one or more selected RF channels.

14. The method of claim 13, where obtaining the channel usage information comprises:
    obtaining channel usage information for the impaired RF channel when a licensed RF spectrum band is associated with a particular congestion level.

15. The method of claim 13, further comprising:
    identifying a set of time slots allocated to one of the one or more selected RF channels, and
    where communicating with the user equipment comprises:
        communicating with the user equipment based on the set of time slots allocated to the one of the one or more selected RF channels.

16. The method of claim 13, further comprising:
    ranking each of the one or more RF channels based on congestion information; and
    applying weights corresponding to the ranking of each of the one or more RF channels, and
    where selecting the one or more RF channels comprises:
        selecting the one or more RF channels based on applying the weights.

17. The method of claim 13, where determining the effective bandwidth of the impaired RF channel comprises:
    determining the effective bandwidth of the impaired RF channel based on configuration information associated with the base station.

18. The base station of claim 1, where the channel usage information for a given RF channel, of the multiple channels, includes one or more of:
    a bandwidth utilization value that is determined based on a ratio of an available bandwidth on the given RF channel to a total bandwidth of the given RF channel,
    an interference value identifying interference received by the base station in association with the given RF channel, or
    a ratio of unallocated time slots on the given RF channel to total time slots on the given RF channel.

19. The non-transitory computer-readable medium of claim 7, where the channel usage information for a given RF channel, of the multiple channels, includes one or more of:
    a bandwidth utilization value that is determined based on a ratio of an available bandwidth on the given RF channel to a total bandwidth of the given RF channel, or
    a ratio of unallocated time slots on the given RF channel to total time slots on the given RF channel.

20. The method of claim 13, where the channel usage information for a given RF channel, of the multiple channels, includes one or more of:
    a bandwidth utilization value that is determined based on a ratio of an available bandwidth on the given RF channel to a total bandwidth of the given RF channel,
    an interference value identifying interference received by the base station in association with the given RF channel, or
    a ratio of unallocated time slots on the given RF channel to total time slots on the given RF channel.

* * * * *